(12) United States Patent
Chelin et al.

(10) Patent No.: US 12,292,015 B2
(45) Date of Patent: May 6, 2025

(54) AIRCRAFT NACELLE EQUIPPED WITH AT LEAST ONE THRUST REVERSAL DEVICE COMPRISING A DOWNSTREAM DEFLECTOR, AIRCRAFT COMPRISING AT LEAST ONE PROPULSION UNIT HAVING SUCH A NACELLE

(71) Applicant: Airbus Operations SAS, Toulouse (FR)

(72) Inventors: Frédéric Chelin, Toulouse (FR); Christophe Bourdeau, Toulouse (FR); Olivier Scholz, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/644,977

(22) Filed: Apr. 24, 2024

(65) Prior Publication Data

US 2024/0360801 A1 Oct. 31, 2024

(30) Foreign Application Priority Data

Apr. 26, 2023 (FR) ...................................... 2304214

(51) Int. Cl.
*F02K 1/72* (2006.01)
*F02K 1/62* (2006.01)
*F02K 1/76* (2006.01)

(52) U.S. Cl.
CPC ................. *F02K 1/72* (2013.01); *F02K 1/625* (2013.01); *F02K 1/763* (2013.01); *F02K 1/766* (2013.01); *F05D 2240/129* (2013.01)

(58) Field of Classification Search
CPC . F02K 1/72; F02K 1/766; F02K 1/625; F02K 1/763; F05D 2240/129
See application file for complete search history.

(56) References Cited

U.S. PATENT DOCUMENTS

| 3,262,270 A | * | 7/1966 | Beavers | F02K 1/72 239/265.19 |
| 3,500,645 A | * | 3/1970 | Felix | F02K 1/72 239/265.29 |
| 3,779,010 A | * | 12/1973 | Chamay | F02K 1/72 239/265.31 |
| 6,546,715 B1 | * | 4/2003 | Blevins | F02K 1/72 239/265.29 |

(Continued)

OTHER PUBLICATIONS

French Search Report for corresponding French Patent Application No. 2304214 dated Nov. 29, 2023.

*Primary Examiner* — Todd E Manahan
*Assistant Examiner* — Rene D Ford
(74) *Attorney, Agent, or Firm* — Greer, Burns & Crain, Ltd.

(57) ABSTRACT

An aircraft nacelle equipped with a thrust reversal device which comprises: at least one deflection system configured to deflect an air stream channeled in the nacelle toward a lateral opening of the nacelle, in the activated state; at least one orientation system having: at least one transverse deflector configured to orient the air stream deflected by the deflection system toward the upstream end of the nacelle, at least one downstream deflector positioned at the downstream edge of the lateral opening and configured to deflect the air stream deflected by the deflection system toward the upstream end of the nacelle.

11 Claims, 4 Drawing Sheets

(56) References Cited

U.S. PATENT DOCUMENTS

| | | | |
|---|---|---|---|
| 2009/0314887 A1* | 12/2009 | Aten | F02K 1/625 |
| | | | 244/110 B |
| 2011/0215193 A1* | 9/2011 | Welch | B64D 27/00 |
| | | | 244/54 |
| 2013/0025260 A1* | 1/2013 | Pitiot | F02K 1/70 |
| | | | 60/226.2 |
| 2013/0067885 A1* | 3/2013 | Suciu | F02K 1/1207 |
| | | | 60/226.2 |
| 2013/0075492 A1* | 3/2013 | Welch | F02K 3/02 |
| | | | 239/265.19 |
| 2013/0092755 A1 | 4/2013 | Aten | |
| 2015/0252680 A1* | 9/2015 | LeBlanc | F01D 7/00 |
| | | | 415/146 |
| 2017/0058829 A1 | 3/2017 | Dong | |

* cited by examiner

AIRCRAFT NACELLE EQUIPPED WITH AT LEAST ONE THRUST REVERSAL DEVICE COMPRISING A DOWNSTREAM DEFLECTOR, AIRCRAFT COMPRISING AT LEAST ONE PROPULSION UNIT HAVING SUCH A NACELLE

CROSS-REFERENCES TO RELATED APPLICATIONS

This application claims the benefit of French Patent Application Number 2304214 filed on Apr. 26, 2023, the entire disclosure of which is incorporated herein by way of reference.

FIELD OF THE INVENTION

The present application relates to an aircraft nacelle equipped with at least one thrust reversal device comprising a downstream deflector and to an aircraft comprising at least one aircraft propulsion unit having such a nacelle.

BACKGROUND OF THE INVENTION

Figure 1:
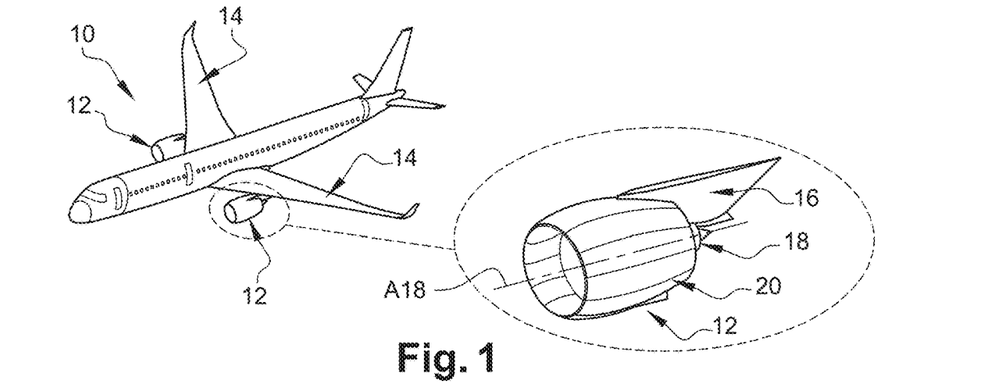
FIG. 1 is a perspective view of an aircraft and a propulsion unit.
Figure 2:
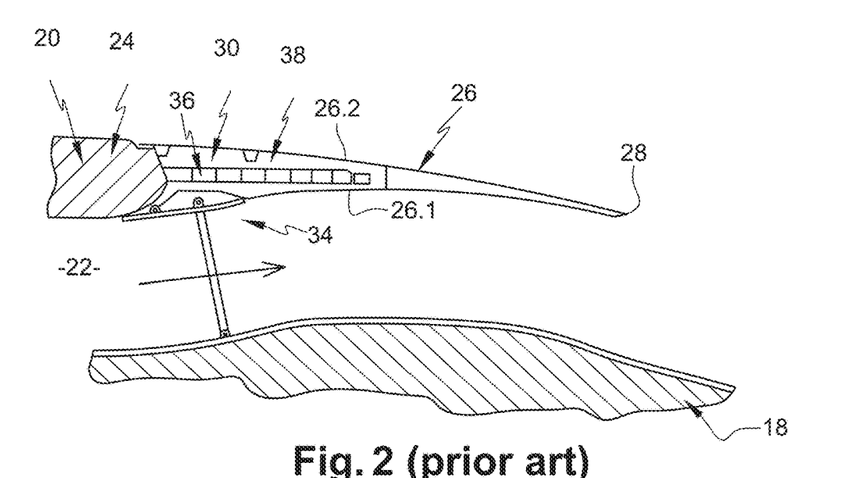
FIG. 2 is a schematic section through a propulsion unit equipped with a thrust reversal device in the inactivated state, illustrating an embodiment of the prior art.
Figure 3:
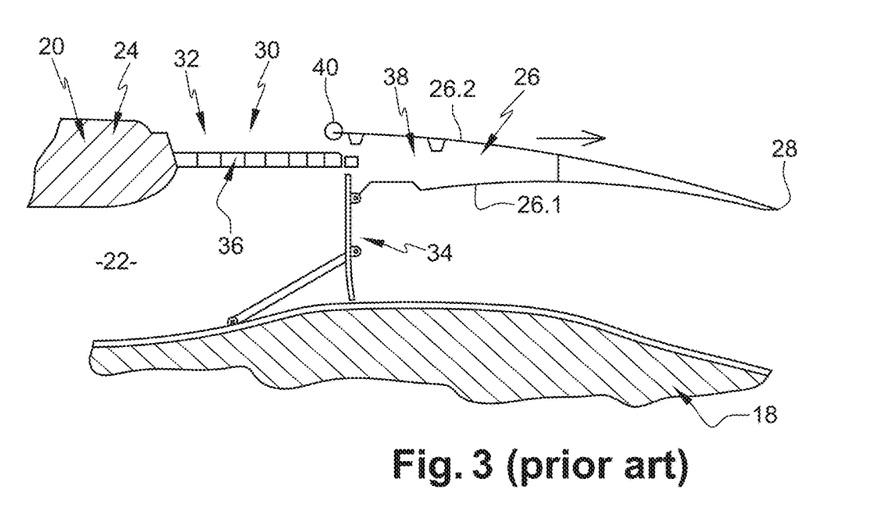
FIG. 3 is a schematic section through the propulsion unit shown in FIG. 2, the thrust reversal device being in the activated state.

According to one embodiment, shown in FIGS. 1 to 3, an aircraft 10 comprises multiple propulsion units 12 positioned beneath each one of the wings 14 of the aircraft 10 and connected to the latter by pylons 16. Each propulsion unit 12 comprises a motor 18 positioned inside a nacelle 20. The motor 18 comprises a fan which has an axis of rotation A18.

For the remainder of the description, a longitudinal direction is parallel to the axis of rotation A18. A longitudinal plane is a plane containing the axis of rotation A18 and a transverse plane is a plane perpendicular to the axis of rotation A18. The concepts of front/upstream and rear/downstream refer to the direction of flow of an air stream in the nacelle 20, this stream flowing from the front (from upstream) to the rear (downstream).

The nacelle 20 has an approximately tubular shape and, with the motor 18, delimits an annular duct 22 in which a secondary air stream flows. The nacelle 20 comprises an upstream part 24 and a downstream part 26, which extends to a trailing edge 28.

The nacelle 20 comprises a thrust reversal device 30 positioned in the downstream part 26 and configured to occupy an activated state in which it deflects, outward and upstream of the nacelle 20, at least some of the secondary air stream circulating in the annular duct 22, and an inactivated state in which it does not deflect the secondary air stream circulating in the annular duct 22.

The thrust reversal device 30 comprises at least one lateral opening 32 (shown in FIG. 3) passing through the nacelle 20. According to one configuration, the downstream part 26 of the nacelle 20 is movable between a first position, corresponding to the inactivated state of the thrust reversal device 30, in which the downstream part 26 is in contact with the upstream part 24 (as illustrated in FIG. 2), and a second position, corresponding to the activated state of the thrust reversal device 30, in which the downstream part 26 is moved away from the upstream part 24 so as to create the lateral opening 32 (as illustrated in FIG. 3).

The thrust reversal device 30 comprises a deflection system 34 configured to occupy a retracted position (shown in FIG. 2), when the thrust reversal device 30 is in the inactivated state, in which the deflection system 34 does not interfere with the secondary air stream, and a deployed position (shown in FIG. 3), when the thrust reversal device 30 is in the activated state, in which the deflection system 34 interferes with the secondary air stream and orients it toward the lateral opening 32.

The thrust reversal device 30 also comprises an orientation system 36 configured to orient, outward and upstream of the nacelle, the air stream deflected by the deflection system 34. In addition, the downstream part 26 comprises a cavity 38 which is open in the direction of the upstream part 24 and is configured to receive the orientation system 36. This cavity 38 is delimited by inner and outer walls 26.1, 26.2 which are at a spacing in the direction of the upstream part 24 and are connected at the trailing edge 28. According to one embodiment, the orientation system 36 comprises multiple cascades of vanes positioned at the lateral opening 32, which each have first walls positioned in approximately longitudinal planes and second walls positioned in approximately transverse planes. The second walls take the form of a vane to deflect upstream the air stream leaving the lateral opening 32.

This embodiment is not satisfactory because the cascades of vanes have a not-inconsiderable mass.

Another drawback, as illustrated in FIG. 3, is that the air stream deflected by the deflection system 34 tends to impact the upstream end 40 of the outer wall 26.2 of the movable part 26, and so it is necessary to reinforce it, with this tending to increase the mass of the nacelle.

SUMMARY OF THE INVENTION

The present invention aims to overcome all or some of the aforementioned drawbacks.

To this end, the invention relates to an aircraft nacelle having an upstream end and a downstream end, configured to channel an air stream flowing in a longitudinal direction from the upstream end to the downstream end, the nacelle having at least one thrust reversal device which comprises:

at least one lateral opening which is remote from the upstream and downstream ends, passes through the nacelle and is delimited by a downstream edge, at least one movable part configured to occupy a first position, corresponding to an inactivated state of the thrust reversal device, in which the movable part shuts off the lateral opening, and a second position, corresponding to an activated state of the thrust reversal device, in which the movable part at least partially clears the lateral opening, at least one deflection system configured to occupy a first position, when the thrust reversal device is in the inactivated state, in which the deflection system does not interfere with the air stream channeled in the nacelle, and a second position, when the thrust reversal device is in the activated state, in which the deflection system interferes with the air stream channeled in the nacelle and orients it toward the lateral opening, at least one orientation system configured to orient the air stream deflected by the deflection system.

According to the invention, the orientation system comprises:

a support comprising first and second crossmembers positioned above and below the lateral opening, at least one transverse deflector positioned approximately in a plane perpendicular to the longitudinal direction and configured to orient the air stream deflected by the deflection system toward the upstream end of the nacelle, said transverse deflector extending between first and second ends connected to the first and second crossmembers, respectively, of the support, at least one downstream deflector positioned at the downstream edge of the lateral opening and configured to deflect the air stream deflected by the deflection system toward the upstream end of the nacelle.

According to the invention, each transverse deflector has a large dimension and extends over the entire height of the opening, thereby making it possible to reduce the mass of the orientation system. In addition, the downstream deflector makes it possible to deflect the air stream generated by the thrust reversal device so that the stream does not impact the downstream edge of the lateral opening, and so it is not necessary to reinforce it.

According to another feature, the downstream deflector comprises a curved surface which extends between an inner first edge positioned in a first transverse plane perpendicular to the longitudinal direction and an outer edge positioned in a second transverse plane, the inner and outer edges having a radius of curvature substantially identical to that of the nacelle, the inner edge being closer to the deflection system than the outer edge is.

According to another feature, the second transverse plane is offset toward the upstream end of the nacelle with respect to the first transverse plane.

According to another feature, the downstream deflector extends between first and second ends, the curved surface having, in longitudinal planes, a substantially constant concave curvature from the first end to the second end.

According to another feature, the downstream deflector comprises an extension, positioned at the outer edge, which has an inner surface facing toward the annular duct and continuing the curved surface.

According to another feature, the inner surface is frustoconical and widens in the direction of the upstream end of the nacelle.

According to another feature, the orientation system comprises a downstream crosspiece which has at least a first wall forming the downstream deflector, an inner wall connected to the first wall at the inner edge, and an outer wall connected to the first wall at the outer edge, the outer wall being cylindrical or frustoconical, widening in the direction of the upstream end of the nacelle and forming an angle with the longitudinal direction of between 0° and 45°.

According to another feature, the downstream deflector is positioned approximately in the continuation of the deflection system when the latter is in the second position.

According to another feature, the support comprises a downstream crosspiece which is positioned downstream of the lateral opening, has a curvature substantially identical to that of the nacelle and integrates the downstream deflector.

According to another feature, the support comprises an upstream crosspiece, the upstream and downstream crosspieces and the first and second crossmembers forming a frame delimiting the lateral opening, the curved surface of the downstream deflector extending from the first crossmember to the second crossmember.

The invention also relates to an aircraft having at least one propulsion unit which comprises a nacelle according to one of the above features.

BRIEF DESCRIPTION OF THE DRAWINGS

Other features and advantages will become apparent from the following description of the invention, the description being given solely by way of example, with reference to the appended drawings, in which.

DETAILED DESCRIPTION OF THE PREFERRED EMBODIMENTS

Figure 4:
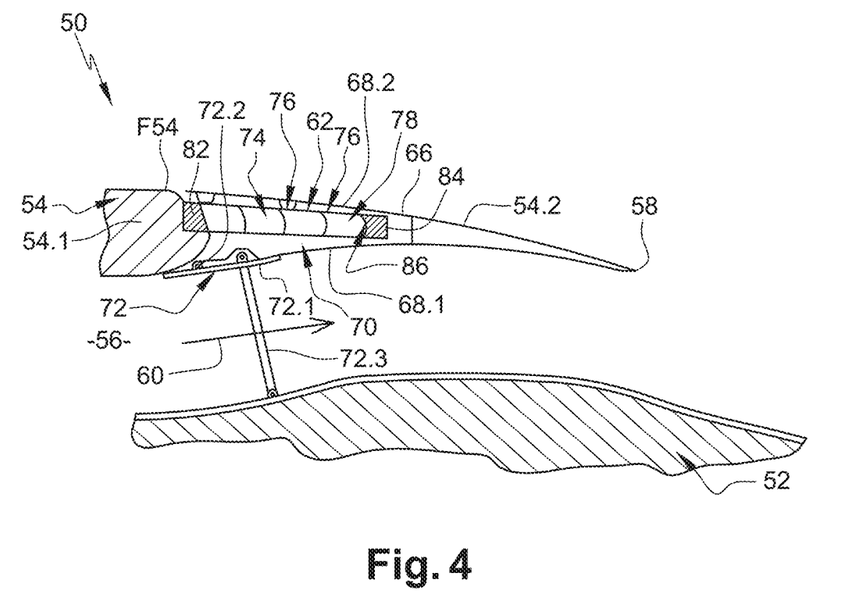
FIG. 4 is a schematic section through a propulsion unit equipped with a thrust reversal device in the inactivated state, illustrating one embodiment of the invention.
Figure 5:
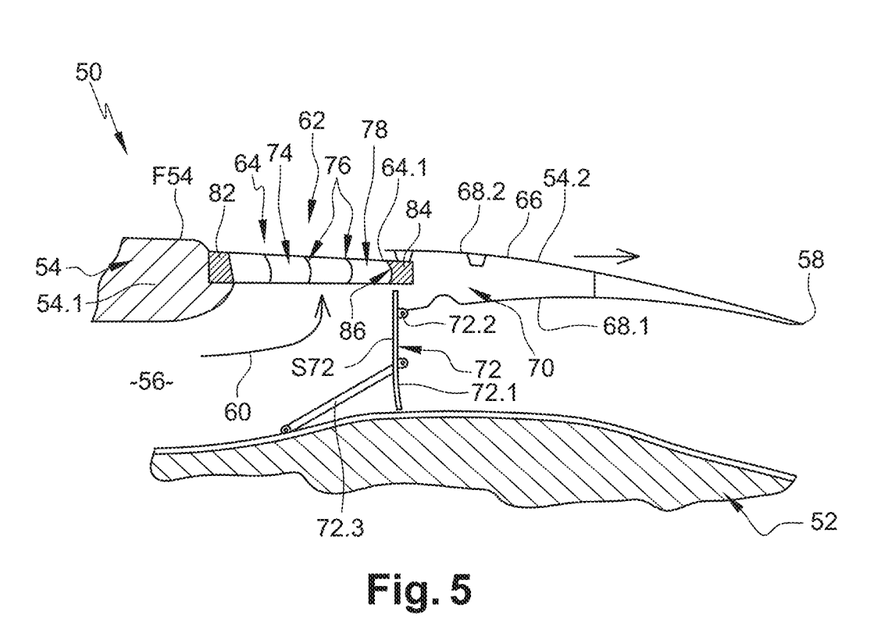
FIG. 5 is a schematic section through the propulsion unit shown in FIG. 4, the thrust reversal device being in the activated state.
Figure 6:
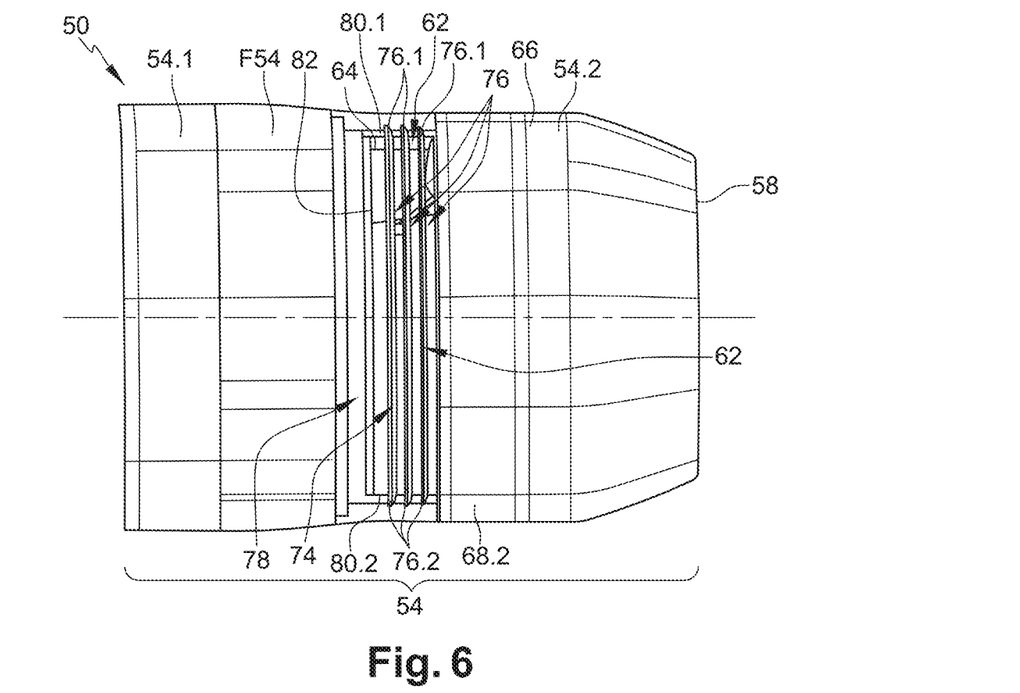
FIG. 6 is a side view of a part of a propulsion unit having a thrust reversal device in the activated state, illustrating one embodiment of the invention.
Figure 7:
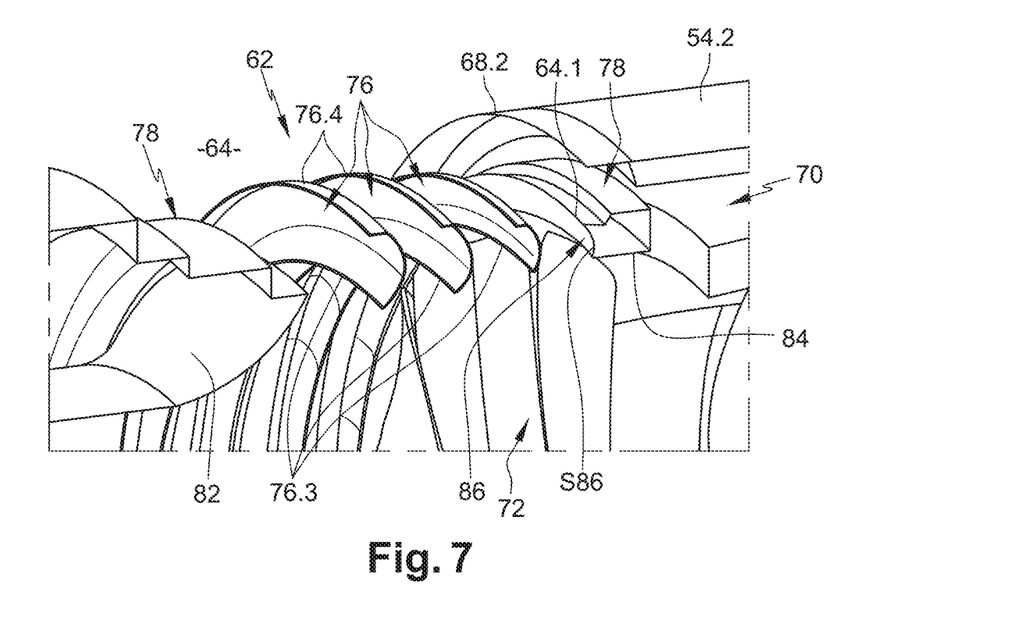
FIG. 7 is a perspective section through a part of a propulsion assembly having a thrust reversal device in the activated state, illustrating one embodiment of the invention.
Figure 8:
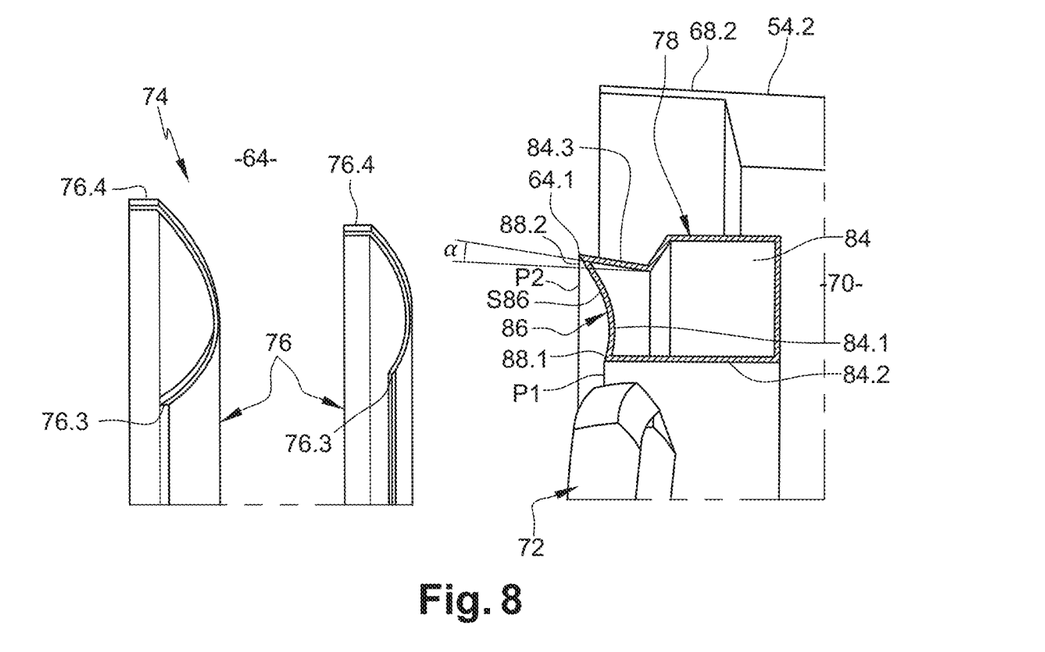
FIG. 8 is a section through a part of a thrust reversal device in the activated state, illustrating one embodiment of the invention.

According to an embodiment shown in FIGS. 4, 5 and 6, a propulsion unit 50 comprises a motor 52 positioned inside a nacelle 54. The nacelle 54 has an approximately tubular shape and, with the motor 52, delimits an annular duct 56 in which a secondary air stream flows. The nacelle 54 comprises an upstream part 54.1 and a downstream part 54.2, which has a trailing edge 58. The nacelle 54 has an outer surface F54.

According to one application, an aircraft comprises at least one such propulsion unit. Irrespective of the embodiment, the nacelle 54 is tubular and extends between upstream and downstream ends. The nacelle 54 is configured to channel an air stream 60 in a longitudinal direction, from the upstream end to the downstream end.

The nacelle 54 comprises at least one thrust reversal device 62 positioned in the downstream part 54.2 and configured to occupy an activated state (shown in FIG. 5) in which it deflects, outward and toward the upstream end of the nacelle 54, at least some of the air stream 60 circulating in the annular duct 56, and an inactivated state (shown in FIG. 4) in which it does not deflect the air stream 60 circulating in the annular duct 56.

The thrust reversal device 62 comprises at least one lateral opening 64, which passes through the nacelle 54, is remote from the upstream and downstream ends of the nacelle 54, and is configured to place the annular duct 56 and the exterior of the nacelle 54, notably its outer surface F54, in communication, and at least one movable part 66 configured to occupy a first position, corresponding to the inactivated state of the thrust reversal device 62 (shown in FIG. 4), in which the movable part 66 closes off the lateral opening 64, and a second position, corresponding to the activated state of the thrust reversal device 62 (shown in FIG. 5), in which the movable part 66 at least partially clears the lateral opening 64.

According to one embodiment, the nacelle 54 comprises two lateral openings 64 which are substantially symmetrical (i.e. +/−10%) with respect to a vertical longitudinal plane passing through the axis of the motor.

According to one configuration, the downstream part 54.2 is a movable O-shaped tubular cowl, forming the movable part 66, which moves in translation in the longitudinal direction between a closed position (shown in FIG. 4) in which the downstream part 54.2 is in contact with the upstream part 54.1, when the thrust reversal device 62 is in the inactivated state, and an open position (shown in FIG. 5) in which the downstream part 54.2 is at a spacing from the upstream part 54.1 so as to create the one or more lateral openings 64 between the upstream and downstream parts 54.1, 54.2 when the thrust reversal device 62 is in the activated state.

The downstream part 54.2 comprises an inner wall 68.1 and an outer wall 68.2 which are connected at the trailing edge 58, the inner and outer walls 68.1, 68.2 delimiting between them a cavity 70 which is open in the direction of the upstream part 54.1.

Of course, the invention is not limited to this configuration for the movable part 66.

The thrust reversal device 62 comprises at least one deflection system 72 configured to occupy a retracted position (shown in FIG. 4), when the thrust reversal device 62 is in the inactivated state, in which the deflection system 72 does not interfere with the air stream 60 channeled by the nacelle 54, and a deployed position (shown in FIG. 5), when the thrust reversal device 62 is in the activated state, in which the deflection system 72 is deployed in the annular duct 56, interferes with the air stream 60 and orients it in radial directions (which are perpendicular to the longitudinal direction) toward the lateral opening 64.

According to one embodiment, for each lateral opening 64, the deflection system 72 comprises at least one panel 72.1 and, for each panel 72.1, at least one articulation 72.2 connecting the panel 72.1 to the nacelle 54 and at least one link rod 72.3 connecting the panel 72.1 to the motor 52. Of course, the invention is not limited to this embodiment for the deflection system 72. Thus, each panel could be connected to the motor 52 via an articulation.

Figure 10:
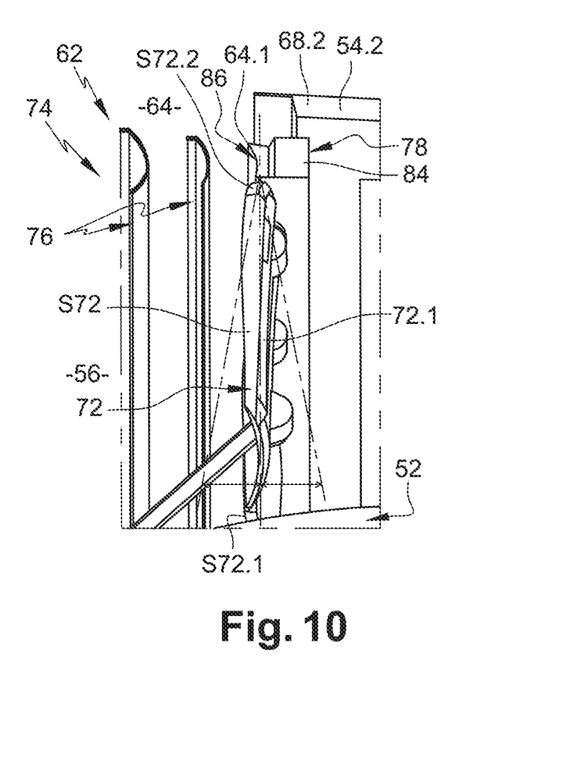

According to one embodiment, shown in FIG. 10, the deflection system 72 comprises a surface S72 against which the deflected air stream 60 flows. According to a first embodiment, in the deployed position, the surface S72 is positioned approximately (i.e., +/−10%) in a transverse plane. According to another embodiment, in the deployed position, the surface S72 is approximately frustoconical and forms an angle with a transverse plane of between −30° and +30°. According to one embodiment, the surface S72 comprises an inner edge 872.1 in the vicinity of the motor 52 and an outer edge S72.2 in the vicinity of the nacelle 54 in the deployed position. According to a preferred configuration, the surface S72 of the deflection system is inclined with respect to a transverse plane, the inner edge 872.1 being located in a first transverse plane, the outer edge S72.2 being located in a second transverse plane offset upstream with respect to the first transverse plane. This configuration limits the risks of the air stream deflected by the deflection system 72 impacting the outer wall 68.2 of the downstream part 54.2 of the nacelle 54.

The thrust reversal device 62 also comprises at least one orientation system 74 configured to orient at least some of the air stream 60 deflected by the deflection system 72 and leaving via the lateral opening 64. In one arrangement, the orientation system 74 is positioned at the lateral opening 64.

In one arrangement, the orientation system 74 and the cavity 70 are configured such that, in the inactivated state, the orientation system 74 is positioned in the cavity 70.

According to one embodiment, the orientation system 74 comprises at least one transverse deflector 76, positioned approximately in a transverse plane, which extends between first and second ends 76.1, 76.2. Each transverse deflector 76 has inner and outer edges 76.3, 76.4 that are curved, substantially in the shape of a circular arc, and connect the first and second ends 76.1, 76.2, the inner edge 76.3 being closer to the deflection system 72 than the outer edge 76.4 is. According to one configuration, the inner and outer edges 76.3, 76.4 have curvatures adapted to those of the inner and outer walls 68.1, 68.2 of the downstream part 54.2 of the nacelle 54 such that the orientation system 74 can be received in the cavity 70 when the thrust reversal device 62 is in the inactivated state.

Each transverse deflector 76 is configured to orient, in the radial directions and toward the upstream end, the air stream deflected by the deflection system 72 and leaving the lateral opening 64.

According to one embodiment, each transverse deflector 76 comprises a blade, in the shape of a ring portion, which has a concave curvature (the center of the radius of curvature being offset upstream with respect to the transverse deflector 76) in longitudinal planes.

According to one configuration, each transverse deflector 76 has a width (distance separating the inner and outer edges 76.3, 76.4) and a curvature that are constant between its first and second ends 76.1, 76.2. As a result, the air stream leaving the nacelle 54 is substantially constant around the perimeter of the nacelle 54. In one arrangement, the transverse deflectors 76 have different widths which decrease from upstream to downstream.

The number of transverse deflectors 76 and their shape are determined so as to obtain the same aerodynamic function as the cascades of the prior art, specifically a sufficient flow rate to avoid operational problems with the fan of the motor 52 and effectiveness as regards reverse thrust.

According to one embodiment, the orientation system 74 comprises at least one support 78, which is secured to the nacelle 54 and to which each transverse deflector 76 is connected.

According to an embodiment shown in FIG. 6, the support 78 comprises first and second crossmembers 80.1, 80.2 which are parallel to one another and to the longitudinal direction and are positioned above and below the lateral opening 64, the first end 76.1 of each transverse deflector 76 being connected to the first crossmember 80.1, the second end 76.2 of each transverse deflector 76 being connected to the second crossmember 80.2.

According to one configuration, the support 78 comprises an upstream crosspiece 82 which is oriented in a direction parallel to a transverse plane, is positioned upstream of the lateral opening 64, and to which the first and second crossmembers 80.1, 80.2 are connected. The upstream crosspiece 82 has a curvature substantially identical to that of the nacelle 54. The upstream crosspiece 82 is secured to or integrated in the upstream part 54.1 of the nacelle 54.

The support 78 comprises a downstream crosspiece 84 oriented in a direction parallel to a transverse plane and positioned downstream of the lateral opening 64. The downstream crosspiece 84 has a curvature substantially identical to that of the nacelle 54.

According to one configuration, the upstream and downstream crosspieces 82, 84 are parallel to one another and are connected by the first and second crossmembers 80.1, 80.2. As a result, the upstream and downstream crosspieces 82, 84 and the first and second crossmembers 80.1, 80.2 form a frame delimiting the lateral opening 64.

According to one particular feature of the invention, the downstream crosspiece 84 comprises at least one face forming a downstream deflector 86 configured to deflect, outward and toward the upstream end of the nacelle 54, the air stream deflected by the deflection system 72 so that the air stream does not impact the outer wall 68.2 of the downstream part 54.2 of the nacelle 54.

The downstream deflector 86 extends between first and second ends, connected to the first and second crossmembers 80.1, 80.2, respectively, and has, in longitudinal planes, a substantially constant cross section from the first end to the second end.

In one arrangement, the downstream deflector 86 is positioned approximately in the continuation of the deflection system 72, more particularly in its one or more panels 72.1, when the deflection system 72 is in the deployed position, such that the air stream deflected by the deflection system 72 impacts and is deflected by the downstream deflector 86.

The downstream deflector 86 comprises a curved surface S86 which extends between inner and outer edges 88.1, 88.2, connecting the first and second ends, the inner edge 88.1 being closer to the deflection system 72 than the outer edge 88.2 is. This curved surface S86 has, in longitudinal planes, a substantially constant concave curvature from the first end to the second end. This concave curvature is designed to deflect the air stream deflected by the deflection system 72 outward and toward the upstream end of the nacelle 54.

The inner and outer edges 88.1, 88.2 have a radius of curvature substantially identical to that of the nacelle 54 to allow the downstream deflector 86 to be positioned in the cavity 70 when the thrust reversal device is in the inactivated state.

According to one configuration, the inner edge 88.1 is positioned in a first transverse plane P1 and the outer edge 88.2 is positioned in a second transverse plane P2 which is offset upstream with respect to the first transverse plane P1.

Figure 9:
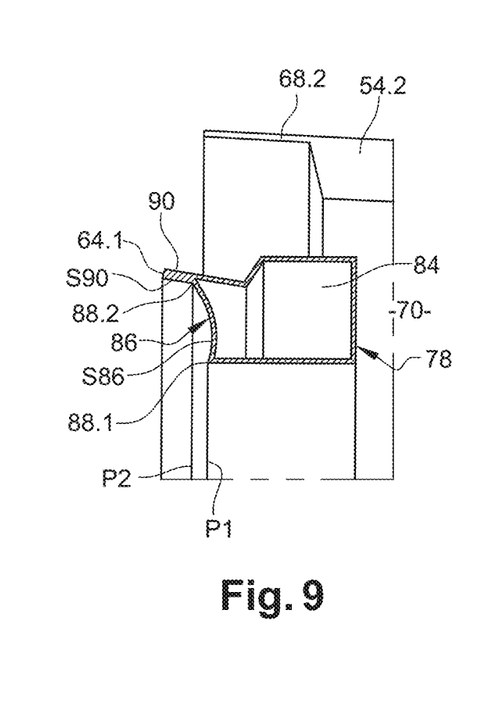
FIG. 9 is a section through a part of a thrust reversal device in the activated state, illustrating another embodiment of the invention, and, FIG. 10 is a section through a thrust reversal device in the activated state, illustrating another embodiment of the invention.

According to an embodiment shown in FIG. 9, the downstream crosspiece 84 is a hollow structure. The downstream crosspiece 84 comprises at least a first wall 84.1 which forms the downstream deflector 86, an inner wall 84.2 connected to the first wall 84.1 at the inner edge 88.1, and an outer wall 84.3 connected to the first wall 84.1 at the outer edge 88.2. The inner wall 84.2 may be substantially cylindrical. In one arrangement, the outer wall 84.3 is cylindrical or frustoconical and widens in the direction of the upstream end of the nacelle. Thus, in a longitudinal plane, the outer wall 84.3 forms an angle $\alpha$ with the longitudinal direction of between 0° and 45°. Varying the angle $\alpha$ makes it possible to increase the dimension of the downstream deflector 86 and control the effectiveness of the deflected air stream.

According to another embodiment shown in FIG. 10, the downstream deflector 86 comprises an extension 90, positioned at the outer edge 88.2, which has an inner surface S90 facing toward the annular duct 56 and continuing the curved surface S86. The extension 90 takes the form of a plate and the inner surface S90 is frustoconical and widens in the direction of the upstream end of the nacelle 54.

According to one embodiment, the downstream deflector 86 is integrated in the downstream crosspiece 84 of the support 78. The latter may be metallic or made from composite material. It may be solid or hollow. According to this embodiment, one of the faces of the downstream crosspiece 84 forms the curved surface S86 of the downstream deflector 86, the curved surface S86 extending from the first crossmember 80.1 to the second crossmember 80.2.

According to another embodiment, the downstream deflector 86 is independent of the support 78.

Irrespective of the embodiment, the lateral opening 64 is delimited by a downstream edge 64.1. In addition, the orientation system 74 comprises at least one downstream deflector 86 positioned at the downstream edge 64.1 of the lateral opening 64 and configured to deflect, toward the upstream end of the nacelle 54, the air stream deflected by the deflection system 72 so that the air stream does not impact the outer wall 68.2 of the downstream part 54.2 of the nacelle 54. As a result, this outer wall 68.2 does not need to be reinforced to withstand the air stream deflected by the thrust reversal device.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft nacelle comprising:
   an upstream end and a downstream end, the aircraft nacelle configured to channel an air stream flowing in a longitudinal direction from the upstream end to the downstream end, and,
   at least one thrust reversal device which comprises:
      at least one lateral opening which is remote from the upstream and downstream ends, passes through the nacelle and is delimited by a downstream edge,
      at least one movable cowl portion configured to occupy a first position, corresponding to an inactivated state of the at least one thrust reversal device, in which the at least one movable cowl portion shuts off the at least one lateral opening, and a second position, corresponding to an activated state of the at least one thrust reversal device, in which the at least one movable cowl portion at least partially clears the at least one lateral opening, the movable cowl portion including an inner wall and an outer wall defining a cavity, and
      at least one panel configured to occupy a first position, when the at least one thrust reversal device is in the inactivated state, in which the at least one panel does not interfere with the air stream channeled in the nacelle, and a second position, when the at least one thrust reversal device is in the activated state, in which the at least one panel interferes with the air stream channeled in the nacelle and orients the air stream toward the at least one lateral opening,
      at least one orientation system configured to orient the air stream deflected by the at least one panel, the at least one orientation system surrounded by the cavity when the movable cowl portion is in the first position and exposed from the cavity when the movable cowl portion is in the second position, wherein the at least one orientation system comprises:

a support comprising a first crossmember positioned at a radial position of the at least one lateral opening with respect to a centerline of the nacelle and at a circumferential position approximately 180 degrees from a second crossmember which is also positioned at the radial position of the at least one lateral opening, at least one transverse deflector positioned approximately in a plane perpendicular to the longitudinal direction and configured to orient the air stream deflected by the at least one panel toward the upstream end of the nacelle, said at least one transverse deflector having at least one edge extending circumferentially between a first transverse deflector end connected to the first crossmember and a second transverse deflector end connected to the second crossmember of the support to form a continuous circumferential space between the first crossmember, the second crossmember, and the at least one transverse deflector, and, at least one downstream deflector positioned at the downstream edge of the at least one lateral opening and configured to deflect the air stream deflected by the at least one panel toward the upstream end of the nacelle, wherein a curvature of the at least one downstream deflector deflects the air stream away from the outer wall of the movable cowl portion.

2. The aircraft nacelle as claimed in claim 1, wherein the at least one downstream deflector comprises a curved surface which extends between an inner first edge of the at least one edge positioned in a first transverse plane perpendicular to the longitudinal direction and an outer edge of the at least one edge positioned in a second transverse plane, the inner first edge and the outer edge having a radius of curvature substantially identical to that of the nacelle, the inner first edge being closer to the at least one panel than the outer edge.

3. The aircraft nacelle as claimed in claim 2, wherein the second transverse plane is offset toward the upstream end of the nacelle with respect to the first transverse plane.

4. The aircraft nacelle as claimed in claim 2, wherein the at least one downstream deflector extends between first and second downstream deflector ends and wherein the curved surface has, in longitudinal planes, a substantially constant concave curvature from the first downstream deflector end to the second downstream deflector end.

5. The aircraft nacelle as claimed in claim 2, wherein the at least one downstream deflector comprises an extension, positioned at the outer edge, which has an inner surface facing toward an annular duct and continuing the curved surface.

6. The aircraft nacelle as claimed in claim 5, wherein the inner surface is frustoconical and widens in a direction of the upstream end of the nacelle.

7. The aircraft nacelle as claimed in claim 2, wherein the at least one orientation system comprises a downstream crosspiece which has at least a first wall forming the at least one downstream deflector, an inner wall connected to the first wall at the inner first edge, and an outer wall connected to the first wall at the outer edge, the outer wall being cylindrical or frustoconical, widening in a direction of the upstream end of the nacelle and forming an angle ($\alpha$) with the longitudinal direction of between 0° and 45°.

8. The aircraft nacelle as claimed in claim 1, wherein the at least one downstream deflector is positioned approximately in a continuation of the at least one panel when the at least one panel is in the second position.

9. The aircraft nacelle as claimed in claim 1, wherein the support comprises a downstream crosspiece which is positioned downstream of the at least one lateral opening, has a curvature substantially identical to that of the nacelle and integrates the at least one downstream deflector.

10. The aircraft nacelle as claimed in claim 9, wherein the support comprises an upstream crosspiece, the upstream and downstream crosspieces and the first and second crossmembers forming a frame delimiting the at least one lateral opening, a curved surface of the at least one downstream deflector extending from the first crossmember to the second crossmember.

11. An aircraft having:
at least one propulsion unit comprising the aircraft nacelle as claimed in claim 1.

* * * * *